United States Patent
Takashima et al.

(10) Patent No.: US 7,053,782 B2
(45) Date of Patent: May 30, 2006

(54) FUEL OVERFLOW ALARM SYSTEM

(75) Inventors: Sumihiro Takashima, Hamamatsu (JP); Tomoyoshi Koyanagi, Hamamatsu (JP)

(73) Assignee: Yamaha Marine Kabushiki Kaisha, Shizuoka-ken (JP)

( * ) Notice: Subject to any disclaimer, the term of this patent is extended or adjusted under 35 U.S.C. 154(b) by 60 days.

(21) Appl. No.: 10/926,775

(22) Filed: Aug. 26, 2004

(65) Prior Publication Data

US 2005/0062594 A1   Mar. 24, 2005

(30) Foreign Application Priority Data

Aug. 26, 2003  (JP) .............................. 2003-208816

(51) Int. Cl.
*G08B 21/00*   (2006.01)

(52) U.S. Cl. ................... 340/616; 340/623; 340/686.1; 340/687; 73/307; 73/308; 73/323

(58) Field of Classification Search ................ 340/616, 340/623, 624, 625, 686.1, 687; 73/307, 308, 73/323

See application file for complete search history.

(56) References Cited

U.S. PATENT DOCUMENTS

| 5,831,536 A | * | 11/1998 | Zager .......................... 340/623 |
| 5,865,222 A | * | 2/1999 | Diamond ..................... 141/86 |
| 6,729,367 B1 | * | 5/2004 | Peterson ..................... 141/198 |
| 2005/0099284 A1 | * | 5/2005 | Dupont .................... 340/450.2 |

FOREIGN PATENT DOCUMENTS

JP   2000 144814   5/2000

* cited by examiner

*Primary Examiner*—Daniel Wu
*Assistant Examiner*—Samuel J. Walk
(74) *Attorney, Agent, or Firm*—Knobbe, Martens, Olson & Bear LLP

(57) ABSTRACT

A fuel overflow alarm system sounds a buzzer or other alarm when a fuel level in a fuel tank of a vehicle or other machine approaches an overflow state, thereby alerting a user that fueling should be halted. The device is activated when a fuel cap or fuel cap cover on a filler inlet tube to the fuel tank is opened and is de-activated when the filler inlet tube is closed. Thus, electrical current drawn by the system can be limited to time periods when the fuel tank is being filled, thereby sparing the electrical system of the vehicle or machine from being depleted during periods of non-use.

20 Claims, 6 Drawing Sheets

FUEL OVERFLOW ALARM SYSTEM

FIELD OF THE INVENTION

The present application is based on and claims priority under 35 U.S.C. § 119 to Japanese Patent Application No. 2003-208816 filed on Aug. 26, 2003, the disclosure of which is hereby incorporated by reference in their entirety.

The invention relates to a fuel tank sensor assembly and, more particularly, to a fuel tank sensor assembly that activates a fuel tank overflow alarm.

BACKGROUND OF THE INVENTION

Knowing when to stop filling a tank with liquid before the tank overflows is desirable, especially when the liquid is pollutant, toxic, corrosive, flammable, or expensive; however, knowing when to stop filling the tank is not always easy when the contents of the tank are not visible to a person filling the tank.

Various systems and methods have been developed to deal with this problem. For example, some filling devices, such as gasoline pumps that are commonly available at urban filling stations for filling the tanks of automobiles and other urban vehicles, sense when a vehicle's fuel tank becomes full and automatically stop fueling.

While such gasoline pumps are commonly available for filling the tanks of automobiles and other vehicles in urban areas, they are not as widely available for use in filling the tanks of other types of vehicles and machinery, including jet propulsion watercraft and other small boats, snowmobiles and other recreational vehicles, and tractors and other farming or rural machinery. These types of vehicles and machines are frequently filled using smaller, less sophisticated filling devices that are not equipped to automatically stop fueling when they sense that the tank they are filling is full. Thus, tanks may overflow, and, in the case of small watercraft being filled with fuel while sitting in water, the spilled fuel often falls into the water.

One current attempt to address the overflow problem, especially in connection with watercraft, snowmobiles, and other recreational vehicles, has been the installation of alarm devices within a fuel tank that sense a fuel level in the tank and that sound an alarm when the tank approaches an overflow state. Unfortunately, such solutions rely on one or more devices that constantly draw a small amount of electrical current from the craft's electrical system. Since recreational vehicles often spend long periods of time unused, even this small draw of electricity can eventually deplete the craft's entire electrical supply and leave the battery dead.

Attempts to alleviate this problem by providing a mechanism which allows a person to manually turn off the alarm device suffer from the disadvantages that the person must first remember to turn the alarm device off if the electrical supply is to be protected against depletion and, second, must remember to turn the alarm device back on again if the tank is to be protected against overflow. Frequently, people forget to diligently carry out these two steps, and the system does not work as desired.

SUMMARY OF THE INVENTION

The over-flow alarm system described herein addresses the above-described deficiencies by providing a fuel overflow alarm device that is configured to automatically turn on when a filling inlet to a fuel tank is open and to automatically turn off when the filling inlet to the fuel tank is closed. Thus, embodiments of the invention provide methods for notifying a user that a fuel tank is approaching a state of overflow, without requiring application of a constant, albeit weak, electrical current. Furthermore, the system requires no actions or decisions on the part of a user other than what he or she would carry out in the normal course of filling a fuel tank. Thus, the possibility that the user may forget to activate and/or de-activate the fuel overflow alarm device is alleviated.

In accordance with a preferred mode of the invention, the fuel overflow alarm device is implemented using a full-tank detection switch and a magnetic float that floats on fuel or other liquid contained in a tank. As the liquid level rises during filling, the float rises and approaches the full-tank detection switch, causing the full-tank detection switch to activate a buzzer (or other signaling device) that alerts a user filling the tank to a near-overflow state of the tank.

However, electrical current to the buzzer is controlled by a filler inlet switch (e.g., a micro-switch) that is mechanically turned on, in one embodiment, when a filler cap to the fuel tank is removed for fueling, and is mechanically turned off when the filler cap is replaced. In another embodiment, the filler inlet switch is similarly turned on and off as a cover to the filler cap is hinged open for fueling or closed. Thus, operation of the fuel overflow alarm device is controlled, at least in part, by the mechanical removal and replacement of a cap or cover to a fuel inlet tube of the fuel tank.

In accordance with one aspect of the present invention, a fuel overflow alarm system is provided for detecting when a fuel tank is full. The fuel overflow alarm system comprises a full tank detection sensor that is arranged to sense at least a generally full condition of the fuel tank. A full tank indicator communicates with the fuel tank detection sensor so as to indicate when the fuel tank diction sensor senses a generally full condition of the fuel tank. A filler inlet switch is actuated when a filler inlet to the fuel tank is opened. The switch makes the full tank detection sensor and the full tank indicator operative when actuated.

Another aspect of the present invention involves a fuel overflow alarm system for detecting when a fuel tank is full. The system comprising a battery, a full tank detection sensor, a full tank indicator and connection means. The connection means selectively connects the full tank detection sensor and the full tank indicator to the battery when the fuel tank is opened. When energized, the full tank detection sensor senses at least a generally full condition of the fuel tank and the fuel tank indicator communicates with the full tank detection sensor.

An additional aspect of the present invention involves a method of indicating when a fuel tank approaches an overflow state to alert a user that fueling should be halted. The method comprising the steps of: detecting when the fuel tank is opened; energizing a full tank sensor when the fuel tank is opened; detecting when the fuel tank is generally full with the energized full tank sensor; indicating to the user when the full tank sensor senses that the fuel tank is generally full; detecting when the fuel tank is closed; and de-energizing the full tank sensor when the fuel tank is closed.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

A general architecture that implements various features of specific embodiments of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements.

The drawings comprise six figures in which.

DETAILED DESCRIPTION OF THE PREFERRED EMBODIMENT

Figure 1:
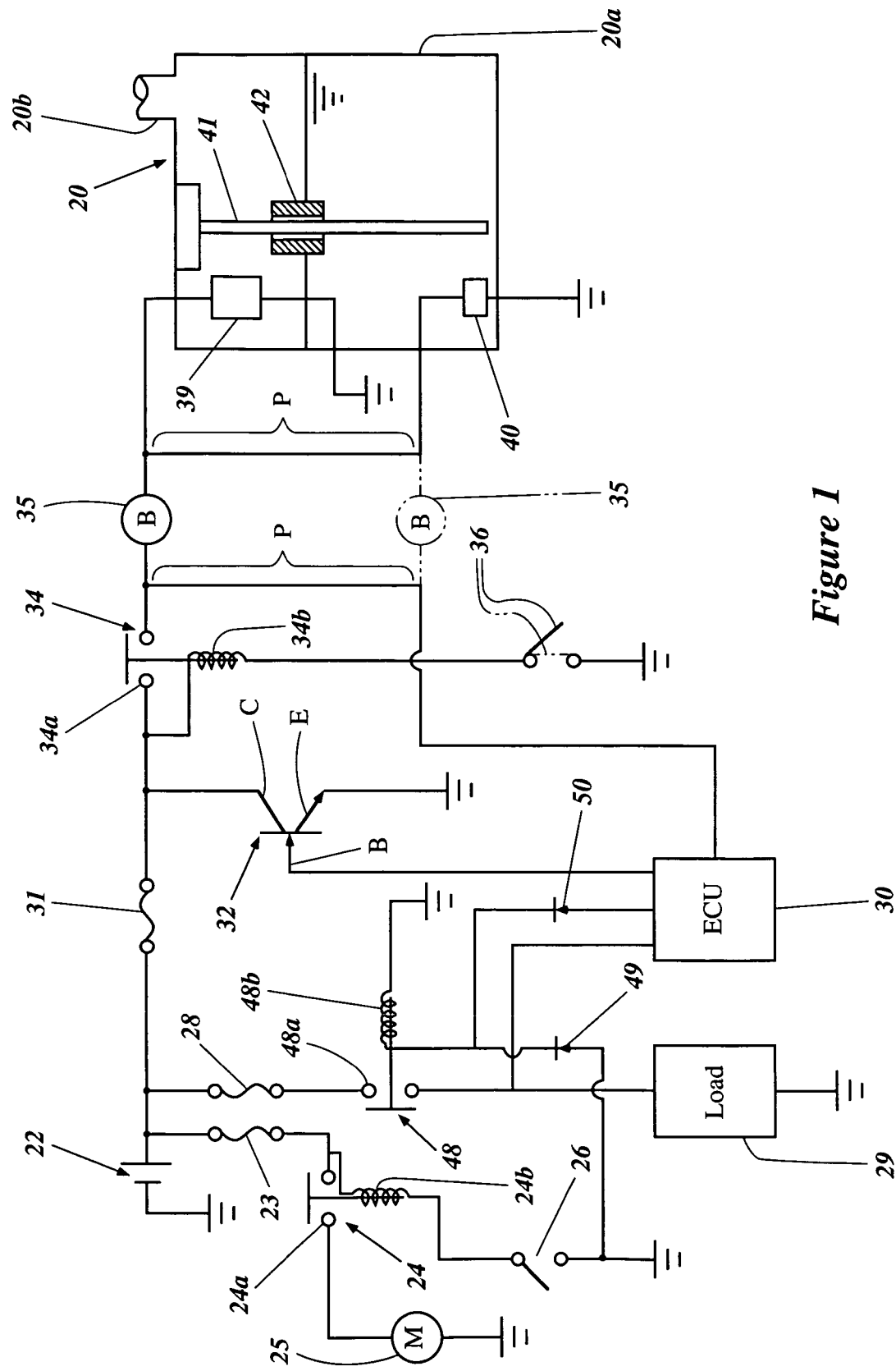
FIG. 1 is an electrical circuit diagram depicting a fuel overflow alarm system configured in accordance with a preferred embodiment of the present invention.

FIGS. 1 and 3–6 depict embodiments of the fuel overflow alarm system. FIG. 2, which will be described first, depicts a water jet propulsion boat, in which the fuel overflow alarm device may be installed. As will be noted below, the present fuel overflow alarm system can be used with other fuel-driven prime movers in vehicles (e.g., recreational vehicles such as, for example, snowmobiles, ATVs, motorcycles) and devices (e.g., generators) as well.

As shown in FIG. 2, a boat body 10 of a water jet propulsion boat is made up of a hull member 11 and a deck member 12. A steering wheel 13 is provided at an upper part of the deck member 12. A straddling type of seat 15 is provided on the deck member 12 behind the steering wheel 13. Footpads 14 for a driver sitting on the seat 15 to place feet are provided on both sides of the seat 15 of the deck member 12.

An engine 16 of the water jet propulsion boat is mounted in an engine compartment of the boat body 10. A jet propulsion unit 17 is mounted in a pump chamber formed in a rear lower part of the hull member 11 of the boat body 10. As an impeller 16a is rotated by the engine 16, water is drawn through a water suction port 11a at the boat bottom. As the water is discharged rearward out of a water discharge port 18 of the jet propulsion unit 17, the boat body 10 is propelled forward.

A fuel tank 20 for supplying fuel to the engine 16 is provided in the boat body 10. The tank 20 has a tank body 20a with a filler tube 20b extending upward from the tank body 20a. As is shown in the embodiment depicted in FIG. 4, a filler inlet 20c is formed at the top end of the filler tube 20b. As is shown in the embodiment depicted in FIG. 3, a filler cap 20e adapted to be fitted or removed as required may be provided at a male thread part 20d of the filler inlet 20c, thereby allowing a user to open or close the filler inlet 20c.

The fuel tank 20 is provided with a fuel overflow alarm system that detects the state of the fuel tank being replenished with fuel to its full capacity and provides an alarm or full signal to inhibit fuel from overflowing at the time of filling. The components and operation of the fuel overflow alarm system are shown in greater detail in FIG. 1, along with other electronics of the watercraft and associated engine 16.

Figure 2:
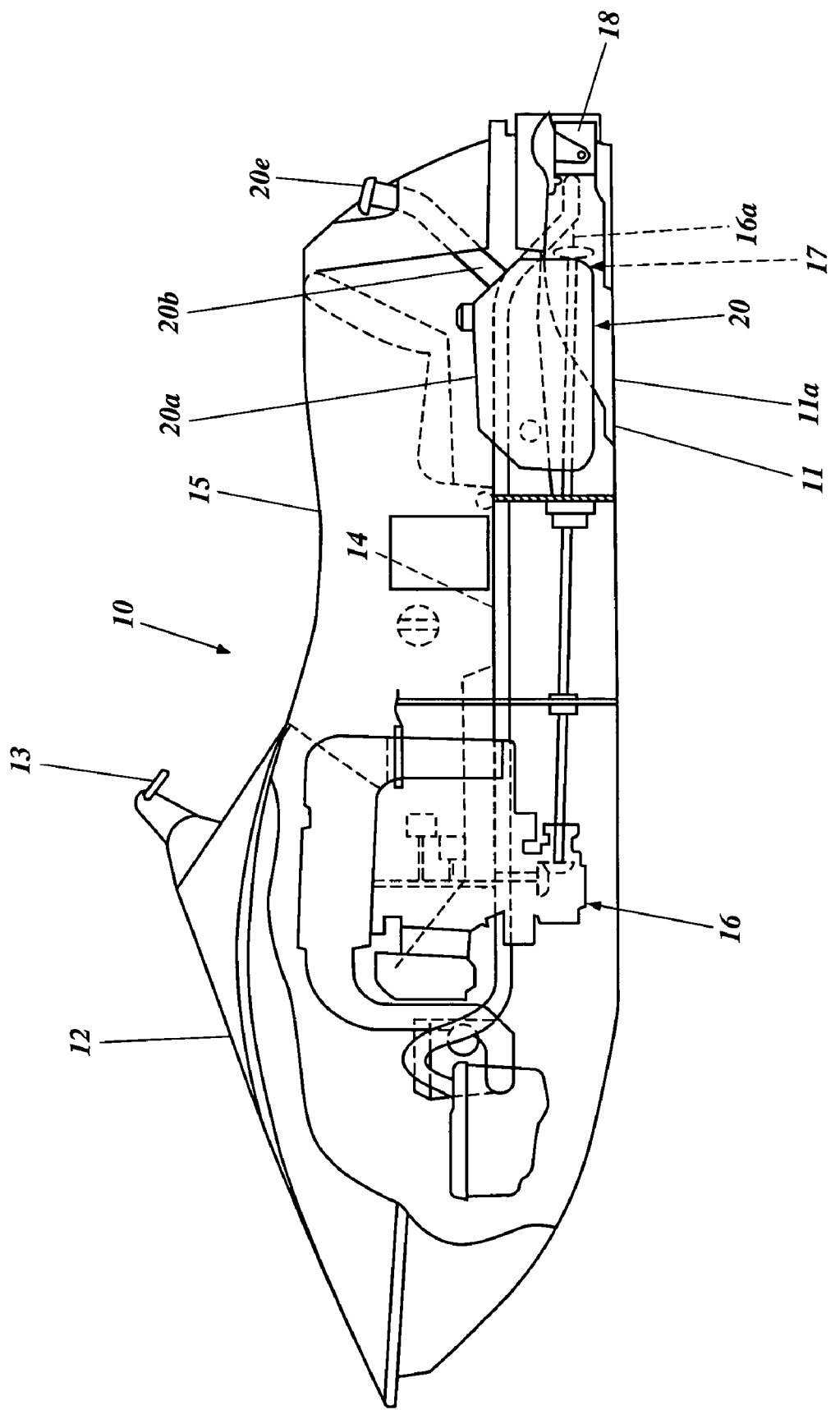
FIG. 2 is a side view of a water jet propulsion boat that includes an the fuel overflow alarm system of FIG. 1.

As shown in FIG. 1, a first relay 24 is connected through a main first fuse 23 to a battery 22. One end of a starter motor 25 is connected to a normally open contact point 24a of a first relay 24 while a second end is grounded. One end of a starter switch 26 is connected to an exciter coil 24b of the first relay 24 while a second end is grounded.

A load circuit 29 (including an engine ignition circuit, a meter power source, and various lamps) and an engine control unit 30 (hereinafter called the ECU) are connected in parallel through a second fuse 28 and a second relay 48 to the battery 22.

One end of a normally open contact point 48a of the second relay 48 is connected to the second fuse 28 while a second end is connected to the load circuit 29 and the ECU 30. One end of an exciter coil 48b of the second relay 48 is connected through a diode 49 to one end on the grounded side of the starter switch 26 and is also connected through a diode 50 to the ECU 30.

The ECU 30 is connected to a base B of a transistor 32. A collector C of the transistor 32 is connected through a third fuse 31 to the battery 22. An emitter E of the transistor 32 is grounded.

The third fuse 31 is connected to a third relay 34. An indicator 35 is connected to a normally open contact point 34a of the third relay 34 and to the ECU 30. While in the illustrated embodiment the indicator 35 is a buzzer, other types of visual and audio alarms can be used as well, or in combination with one another.

One end of a filler inlet switch 36 is connected to an exciter coil 34b of the third relay 34, while a second end is grounded. In the illustrated embodiment, the filler inlet switch 36 is adapted to be on when the filler cap 20e is removed to open the filler inlet 20c.

The filler inlet switch 36 senses when the inlet to the tank is opened in order to activate at least a portion of a fuel level detection device (which is described below), which in turn indicates when the tank is generally full. For this purpose, the filler inlet switch can sense when a cover (e.g., the filler cap 20e) is removed or when an abrupt pressure change occurs within the tank, which is indicative of opening the inlet to the fuel tank. In illustrated embodiment, the filler inlet switch 36 preferably takes the form of a micro-switch, which is shown in detail in FIGS. 3 and 4. In other variations, however, the filler inlet switch 36 can be any of a wide variety of mechanical, electro-mechanical, and elector-magnetic switches. For example, the filler inlet switch can be a proximity switch that senses when a magnetic element (e.g., an annular magnetic ring) on the filler cap 20e is in close proximity with the proximity switch. Additionally, as noted above, the filler inlet switch 36 alternatively can sense abrupt pressure changes within the tank to detect when the fuel cap 20e has been removed. When the tank inlet is opened, the filler inlet switch 36 either can send a signal to a control device or can provide or interrupt an electrical pathway if hardwired into the circuitry. In the embodiment shown in FIG. 1, the filler inlet switch 36 is hardwired so as to provide an electrical pathway when the filler cap 20e is removed.

Figure 3:
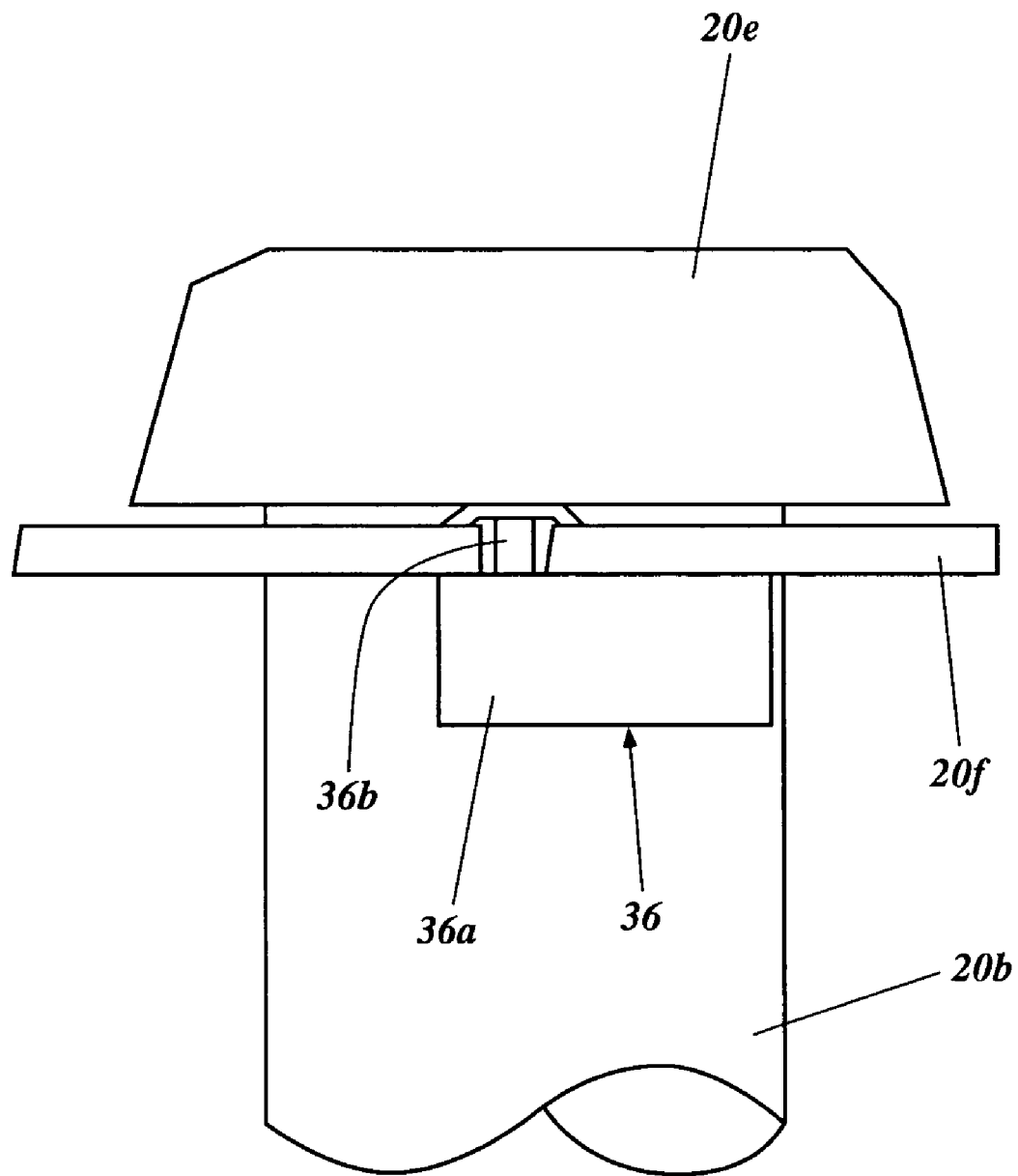
FIG. 3 is a schematic drawing of a fuel cap in a fitted state in accordance with an embodiment of the invention.
Figure 4:
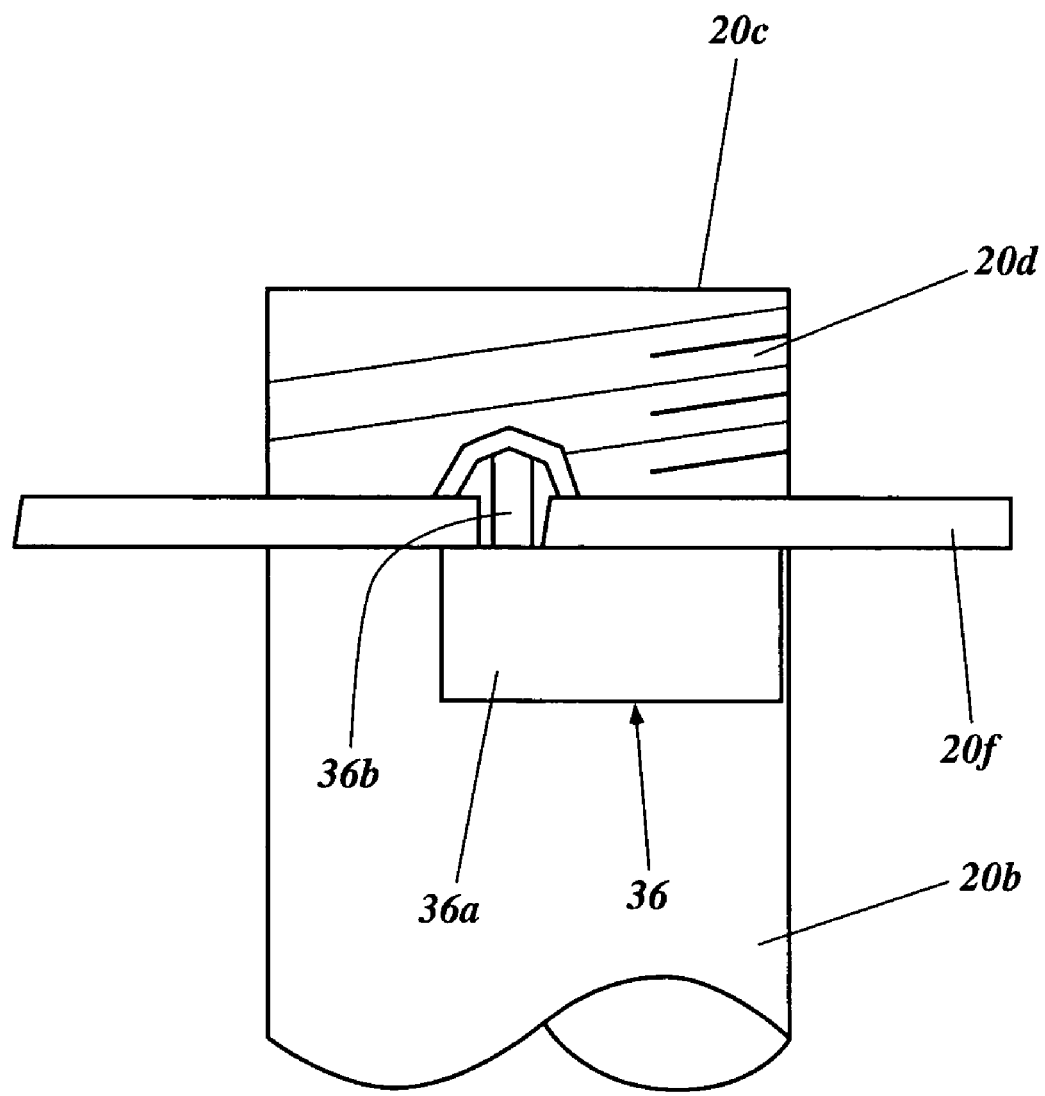
FIG. 4 is a schematic drawing of the fuel cap of FIG. 3 in a removed state.

As seen in FIGS. 3 and 4, the filler inlet switch 36 includes an action pin 36b, which is movable, projects from a switch body 36a and is urged upward with a spring (not shown). The switch body 36a is secured to an underside of a flange portion 20f provided on the filler tube 20b of the fuel tank 20, with the action pin 36b projecting upward through a hole in the flange portion 20f. As illustrated in FIGS. 3 and 4, a protective membrane or shield covers an outer end of the action pin 36b and acts as a barrier to isolate the switch 36 from any liquid (e.g., fuel) that may spill onto the flange when filling the tank. When a filler cap 20e is screwed onto a male thread part 20d to close the filler inlet 20c, as shown in FIG. 3, the switch body 36a is turned off as the action pin 36b is depressed by the filler cap 20e. When the filler cap 20e is removed from the male thread part 20d to open the filler inlet 20c, as shown in FIG. 4, the depression of the action pin 36b by the filler cap 20e is released, and the switch body 36a is turned on as the action pin 36b projects upward.

With reference back to FIG. 1, one end of a full tank detection switch 39, serving as the "full tank detection sensor," and one end of an empty tank detection switch 40, serving as the "empty tank detection sensor, which are provided in the tank body 20a, are connected to the buzzer 35, while the other ends are grounded. In the illustrated embodiment, these switches 39, 40 are proximity switches; however, other type of level sensing devices and switches can be used as well. The illustrated switches 39, 40 are activated by magnetic force produced in a float 42 that floats on liquid in the tank body 20a. As the float 42 is guided to move vertically along a column 41 according to the change in the fuel liquid level, the float 42 approaches one or the other of the switches 39, 40.

As the fuel tank 20 is being filled with fuel, the float 42 approaches the full tank detection switch 39 and the state of the fuel tank 20 is detected by the full tank detection switch 39. As the fuel is used and the level of fuel in the tank 20 drops, the float 42 approaches the empty tank detection switch 40, and the state of the fuel tank being nearly empty is detected with the empty tank detection switch 40. In one embodiment, the buzzer 35 sounds an alarm in either detected state.

The operation of the fuel overflow alarm system will be described with respect to the embodiment illustrated in FIGS. 1, 3 and 4. In normal use, the filler cap 20e covers and closes the filler tube 20b, as depicted in FIG. 3. For example, the filler cap 20e may be screwed on to a male thread part 20d of the filler tube 20b, thereby closing the filler inlet 20c and depressing the action pin 36b attached to a filler inlet switch 36.

When the filler cap 20e is removed to allow for replenishment of fuel in the fuel tank 20, the action pin 36b of the filler inlet switch 36 is allowed to extend upward, as shown in FIG. 4, which turns on the filler inlet switch 36. As shown in FIG. 1, when the filler inlet switch 36 is turned on, electric current flows through the exciter coil 34b of the third relay 34, energizing it and closing the normally open contact point 34a, which turns the third relay 34 on.

As fuel is poured through the filler inlet 20c into the fuel tank 20a in the above state, the float 42 rises along the column 41 corresponding to the rise of the fuel liquid level. As the fuel level approaches full height, the float 42 approaches the full tank detection switch 39. The switch 39 then detects the magnetic force of the float 42 and turns itself on to close the circuit between the battery and the buzzer 35. The buzzer accordingly sounds when connected to the battery.

In this way, the buzzer 35 is energized to produce an alarm sound. The person filling the tank will recognize that the fuel tank is filled and will stop fueling at this point to avoid spilling fuel from the filler inlet 20c.

In this embodiment, the filler inlet switch 36 is mechanically turned on by removing the filler cap 20e for replenishment, so that the buzzer 35 is made operative through the third relay 34. Since the arrangement is de-energized when the filler cap 20e is attached to the filler tube 20b, it is unnecessary to constantly apply a weak current to the detection switches 39, 40, and it is possible to prevent the battery 22 from running down, even if the arrangement is left unused for a long period of time.

Since in the illustrated embodiment the buzzer 35 is made operative by simply removing the filler cap 20e, operability is improved. Additionally, because the filler cap 20e is inevitably removed at the time of filling, the person filling the tank need not remember to activate the overflow alarm system immediately before filling the tank.

In some modes of operation, the buzzer 35 is de-energized, and alarm sound is stopped when the filler cap 20e is replaced on the filler tube 20b, consequently depressing the action pin 36b and turning off the filler inlet switch 36. Alternatively, the buzzer 35 can stop automatically after sounding for a pre-determined period of time.

With reference again to FIG. 1, when the starter switch 26 is turned on, the exciter coil 24b of the first relay 24 is energized, closing the normally open contact point 24a, energizing the starter motor 25, and the engine 16 is started.

When the starter switch 26 is turned on, the exciter coil 48b of the second relay 48 is energized and excited to close the normally open contact point 48a, energizing the load circuit 29 and the ECU 30. Even if the starter switch 26 is released, since the exciter coil 48b remains energized by current via the ECU 30 and the diode 50, the second relay 48 remains energized. When the engine 16 is stopped, however, the ECU 30 de-energizes the exciter coil 48b and the second relay 48 is turned off to de-energize the load circuit 29 and the ECU 30. Since the load circuit 29 and the ECU 30 are de-energized in the state of the engine at rest, current cannot be consumed by these components.

When the engine 16 is in operation, signals are outputted from the ECU 30 to the base B of the transistor 32, and the collector C and the emitter E are shorted to each other. Thus, electric current does not flow toward the third relay 34, and the third relay 34 remains turned off.

When fuel is consumed in the above state, the float 42 in the fuel tank 20 lowers according to lowering of the liquid level. When the liquid level falls to an almost empty state, the float 42 comes close to the empty tank detection switch 40. The switch 40 then detects magnetic force of the float 42 and turns itself on. Thus, the buzzer 35 is energized through the ECU 30 to produce an alarm sound, allowing an operator of the vehicle to recognize that fuel in the fuel tank has diminished to a small amount. In the embodiment shown, the buzzer 35 is controlled with the ECU 30, and the alarm stops sounding after a predetermined period of time.

In this way, the float 42 and the buzzer 35 are used to give alarms both at when the tank is full and when the tank is empty, so that the number of components is reduced to simplify the constitution.

Figure 5:
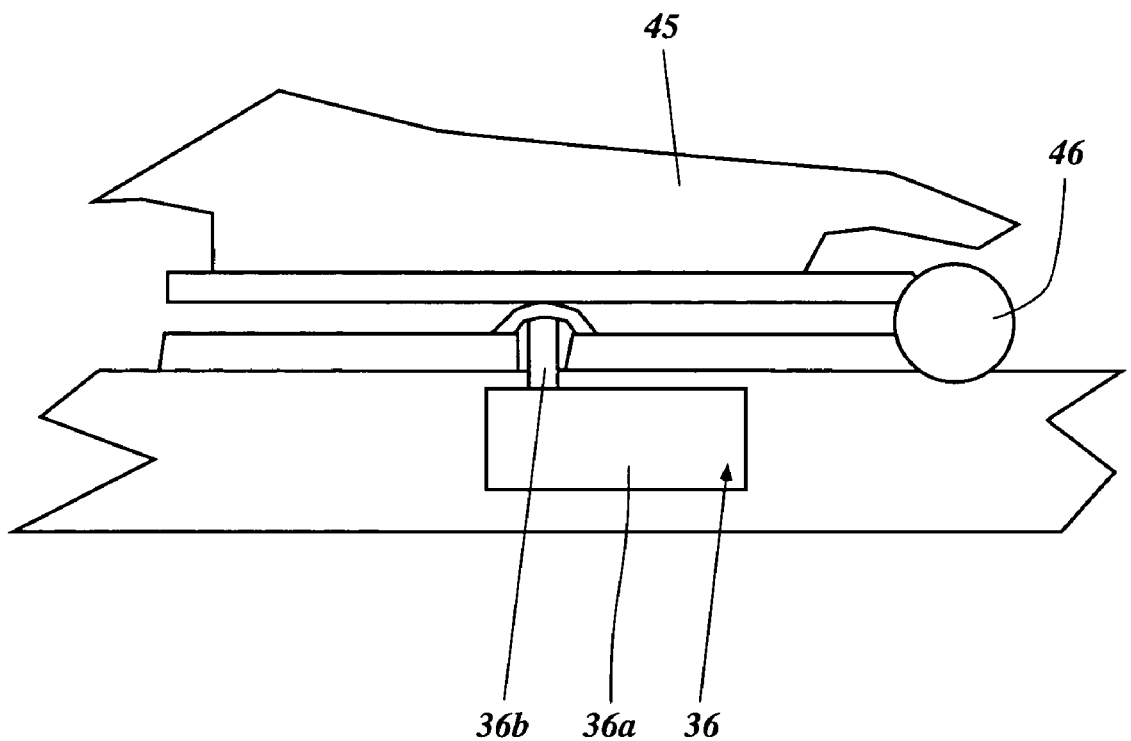
FIG. 5 is a schematic drawing of a fuel cap cover in a fitted state according to an embodiment of the invention.
Figure 6:
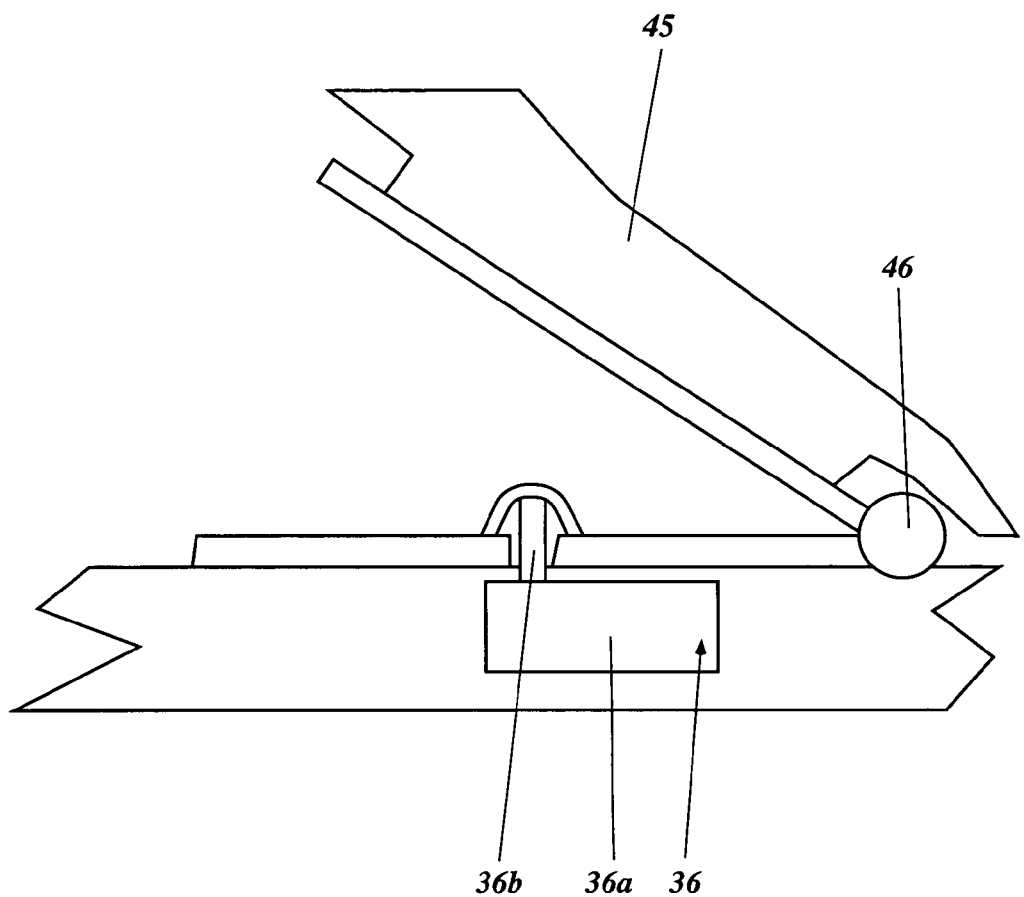
FIG. 6 is a schematic drawing of the fuel cap cover of FIG. 5 in a lifted state.

Another embodiment of the filler inlet switch 36 and its cooperation with a inlet cover to the fuel tank is illustrated by FIGS. 5 and 6. This embodiment differs from that illustrated in FIGS. 3 and 4 in regards to the position where the filler inlet switch 36 is provided and in the method of closure used for the filler tube 20b. In the embodiment illustrated in FIGS. 5 and 6, a cover 45 is provided to cover the filler cap (not shown) for opening and closing the filler inlet, and the filler inlet switch 36 is provided to be turned on and off with the cover 45. The Other circuits in this embodiment are configured the same as those in the embodiment shown in FIG. 1.

The cover 45 is configured to swing about a hinge 46 so as to cover and uncover a top side of the filler cap, which is disposed underneath the closed cover 45. When the cover 45 is lifted, the space above the filler cap is made open, so that the filler cap can be fitted or removed. Alternatively, the cover 45 can close the inlet to the tank. Therefore, it can be assumed that the cover 45 is lifted without fail when the fuel tank 20 is to be refilled.

When the cover 45 is replaced, as shown in FIG. 5, the action pin 36*b* of the filler inlet switch 36 is depressed against the urging force of a spring (not shown), so that the switch 36 is turned off. When the cover 45 is swung up as shown in FIG. 6, the depression on the action pin 36*b* of the filler inlet switch 36 is released, and the pin 36*b* is made to project with the urging force of the spring, so that the switch 36 is turned on.

Also, in the case the filler inlet switch 36 is provided in the area where the cover 45 is provided as described above, since the cover 45 is always lifted at the time of filling, it is possible to arrange that the filler inlet switch 36 is turned on when the cover 45 is lifted and to give out an alarm when the tank is full, the same effect as that with the first embodiment is provided.

While the overflow alarm system has been described as being used in a fuel tank for a water jet propulsion boat (e.g., a personal watercraft) in the above embodiments, the aspects and features of the present system are not limited to this environment of use, but rather can be also employed with other types of boats, snowmobile, ATVs (all terrain vehicles), motorcycles, tractors, engine-operated generators, and the like. Moreover, while the buzzer 35 in the above embodiments is commonly used to indicate when the tank is full and empty, an additional buzzer (or other indicator) can be provided, as indicated by the phantom lines in FIG. 1. In that case, the connection line, the part P in FIG. 1, is to be eliminated.

Since it is arranged in the illustrated embodiment that the filler inlet switch 36 is mechanically turned on to energize the full tank detection sensor 39 and the full tank alarm when the filler inlet is uncovered for filling, these components are de-energized when the filler inlet is closed, unlike in conventional arrangement. As such, these components do not draw current when the filler inlet is closed so as not to drain the battery 22 during period of non-use.

Furthermore, since the full tank detection sensor 39 and the full tank alarm are made operative without fail by opening the filler inlet at the time of filling, operability is improved; the user cannot forget to activate the system to give an alarm when the tank is nearly full before filling the tank.

In the embodiment shown in FIG. 1, the full tank detection sensor 39 is placed in the fuel tank 20 and is configured to be activated as the float 42 moves up as the liquid level rises in the tank. The empty tank sensor is provided to be turned on as the liquid level falls and the float approaches the sensor in a downward motion. An empty tank alarm (e.g., a indicator light or buzzer) can be provided to indicate when the empty tank detection sensor 40 is activated. Therefore, both a full tank state and an empty tank state can be recognized, and it is possible to use a single float 42 in common to detect both of the full tank state and the empty tank state so as to simplify the watercraft. In this arrangement, the alarm for low fuel preferably operates independently of the filler inlet switch 36.

Although the fuel overflow alarm device has been described in terms of certain preferred embodiments, other embodiments will be apparent to those of ordinary skill in the art from the disclosure herein. Additionally, other combinations, omissions, substitutions and modifications will be apparent to the skilled artisan in view of the disclosure herein. While certain embodiments of the inventions have been described, these embodiments have been presented by way of example only, and are not intended to limit the scope of the inventions. Indeed, the novel methods and systems described herein may be embodied in a variety of other forms without departing from the spirit thereof. The accompanying claims and their equivalents are intended to cover such forms or modifications as would fall within the scope and spirit of the invention.

What is claimed is:

1. A fuel overflow alarm system for detecting when a fuel tank is full comprising:
    a full tank detection sensor arranged to sense at least a generally full condition of the fuel tank;
    a full tank indicator communicating with the fuel tank detection sensor so as to indicate when the fuel tank detection sensor senses a generally full condition of the fuel tank;
    a filler inlet switch that is actuated when a filler inlet to the fuel tank is opened and that makes the full tank detection sensor and the full tank indicator operative when actuated.

2. The fuel overflow alarm system according to claim 1, wherein the filler inlet switch is adapted to turn on when a filler cap for opening and closing the filler inlet is removed, and is turned off when the filler cap closes the filler inlet.

3. The fuel overflow alarm system according to claim 1, wherein the filler inlet switch is adapted to turn on when a cover for covering the filler cap is lifted, and is turned off when the cover covers the filler cap.

4. The fuel overflow alarm system according to claim 1, wherein the full tank detection sensor is disposed in the fuel tank and is adapted to turn on as a float, that moves up and down according to change in a level of fuel present in the fuel tank, rises to approach the sensor.

5. The fuel overflow alarm system according to claim 4 additionally comprising an empty tank detection sensor that turns on as the float lowers to approach the empty tank detection sensor, and an empty tank alarm communicating with the empty tank detection sensor so as to indicate when the empty tank detection sensor is on.

6. The fuel overflow alarm system according to claim 1, additionally comprising an empty tank detection sensor arranged to sense at least a generally empty condition of the fuel tank, the empty tank detection sensor communicating with the full tank indicator such that the indicator alerts when both full and empty conditions of the fuel tank occur.

7. The fuel overflow alarm system according to claim 1, wherein the full tank detection sensor, the filler inlet switch, and the a full tank indicator are arranged in series.

8. The fuel overflow alarm system according to claim 1, wherein the fuel tank is arranged to supply fuel to an engine that drives a jet propulsion device.

9. A fuel overflow alarm system for detecting when a fuel tank is full, comprising:
    a battery;
    a full tank detection sensor to sense at least a generally full condition of the fuel tank, the full tank detection sensor being selectively coupled with the battery;

a full tank indicator communicating with the fuel tank detection sensor and being selectively coupled with the battery; and connection means for selectively connecting the full tank detection sensor and the full tank indicator to the battery when the fuel tank is opened.

10. The fuel overflow alarm system according to claim 9, wherein the connection means is disposed at an inlet end of a filler tube of the fuel tank.

11. The fuel overflow alarm system according to claim 9, wherein the connection means is disposed between the battery and at least one of the full tank detection sensor and the full tank indicator.

12. The fuel overflow alarm system according to claim 9, where in the connection means communicates with a controller.

13. The fuel overflow alarm system according to claim 9, wherein the full tank detection sensor is disposed near a fuel level float located in the fuel tank and is adapted to turn on when the float lies next to the sensor.

14. The fuel overflow alarm system according to claim 13 additionally comprising an empty tank detection sensor that turns on as the float lowers to approach the empty tank detection sensor, and an empty tank alarm communicating with the empty tank detection sensor so as to indicate when the empty tank detection sensor is on.

15. The fuel overflow alarm system according to claim 9 additionally comprising an empty tank detection sensor arranged to sense at least a generally empty condition of the fuel tank, the empty tank detection sensor communicating with the full tank indicator such that the indicator alerts when both full and empty conditions of the fuel tank occur.

16. The fuel overflow alarm according to claim 9, wherein in the battery, the full tank detection sensor and the connection means are disposed in series.

17. The fuel overflow alarm system according to claim 9, wherein the fuel tank is arranged to supply fuel to an engine that drives a jet propulsion device.

18. A method of indicating when a fuel tank approaches an overflow state to alert a user that fueling should be halted comprising the steps of:

detecting when the fuel tank is opened;

energizing a full tank sensor when the fuel tank is opened;

detecting when the fuel tank is generally full with the energized full tank sensor;

indicating to the user when the full tank sensor senses that the fuel tank is generally full;

detecting when the fuel tank is closed; and de-energizing the full tank sensor when the fuel tank is closed.

19. The method of claim 18, wherein detecting when the fuel tank is opened involves determining when a cover to a filler tube of the fuel tank is removed, and determining when the fuel tank is closed involves determining when the cover is replaced.

20. The method of claim 18, wherein indicating a full tank condition involves energizing an audible alarm.

\* \* \* \* \*